(12) United States Patent
Satarino et al.

(10) Patent No.: US 11,124,159 B2
(45) Date of Patent: Sep. 21, 2021

(54) WASHER FLUID VEHICLE RESERVOIR

(71) Applicant: Toledo Molding & Die, Inc., Toledo, OH (US)

(72) Inventors: Charles David Satarino, Milan, MI (US); Robert Olsen, Monroe, MI (US)

(73) Assignee: Toledo Molding & Die, LLC, Toledo, OH (US)

( * ) Notice: Subject to any disclaimer, the term of this patent is extended or adjusted under 35 U.S.C. 154(b) by 190 days.

(21) Appl. No.: 15/900,390

(22) Filed: Feb. 20, 2018

(65) Prior Publication Data

US 2018/0251099 A1 Sep. 6, 2018

Related U.S. Application Data

(63) Continuation-in-part of application No. 15/819,870, filed on Nov. 21, 2017.

(60) Provisional application No. 62/425,412, filed on Nov. 22, 2016.

(51) Int. Cl.
| | |
|---|---|
| *B60S 1/48* | (2006.01) |
| *B60S 1/50* | (2006.01) |
| *B05B 7/24* | (2006.01) |
| *B05B 9/04* | (2006.01) |
| *B05B 1/00* | (2006.01) |

(52) U.S. Cl.
CPC ............... *B60S 1/481* (2013.01); *B60S 1/50* (2013.01); *B05B 1/005* (2013.01); *B05B 7/2486* (2013.01); *B05B 9/0423* (2013.01)

(58) Field of Classification Search
CPC .... B60S 1/481; B60S 1/52; B60S 1/66; B60S 1/48; B60S 1/482; B60S 1/483; B60S 1/50; B05B 7/0025; B05B 7/2486
See application file for complete search history.

(56) References Cited

U.S. PATENT DOCUMENTS

| | | | | |
|---|---|---|---|---|
| 3,901,444 | A | * 8/1975 | Maltbie | ............... B60S 1/54 239/112 |
| 4,252,274 | A | * 2/1981 | Kubacak | ............. E01H 11/00 239/163 |
| 4,289,276 | A | * 9/1981 | Bollina | .............. B60S 3/044 239/305 |
| 5,000,333 | A | 3/1991 | Petrelli | |
| 5,118,040 | A | * 6/1992 | Abe | .................. B60S 1/52 239/284.1 |
| 5,152,462 | A | * 10/1992 | Evans | ................. B05B 7/02 239/304 |

(Continued)

FOREIGN PATENT DOCUMENTS

| | | |
|---|---|---|
| EP | 2815936 | 12/2014 |
| EP | 3153361 | 4/2017 |

(Continued)

*Primary Examiner* — Alex M Valvis
(74) *Attorney, Agent, or Firm* — McHale & Slavin, P.A.

(57) ABSTRACT

Disclosed is an improved vehicle reservoir system for managing the distribution of applicable fluids, including either liquids or gases individually, simultaneously, or a combination of these in a predefined sequence. In one embodiment, a first reservoir contains a non-pressurized fluid that is transferred to a distribution manifold and a second reservoir contains a pressurized fluid that can be transferred to the distribution fluid for admixing with the first reservoir fluid, or to a second distribution manifold, or a combination thereof.

9 Claims, 3 Drawing Sheets

(56) References Cited

U.S. PATENT DOCUMENTS

| | | | |
|---|---|---|---|
| 6,237,861 B1 | 5/2001 | Northrop et al. | |
| 6,508,275 B1 | 1/2003 | Sadr et al. | |
| 6,554,207 B2 * | 4/2003 | Ebberts | A47L 11/34 |
| | | | 222/145.5 |
| 7,017,629 B2 | 3/2006 | Winterling | |
| 7,721,774 B2 | 5/2010 | Cook et al. | |
| 2003/0042328 A1 * | 3/2003 | Wojan | B60S 1/481 |
| | | | 239/284.1 |
| 2003/0127542 A1 * | 7/2003 | Cooper | B05B 12/1418 |
| | | | 239/548 |
| 2009/0211605 A1 * | 8/2009 | Ahmad | B60S 1/481 |
| | | | 134/18 |
| 2014/0079652 A1 * | 3/2014 | Cooper | B05B 7/2489 |
| | | | 424/59 |
| 2016/0367105 A1 * | 12/2016 | Cantrell | A47L 15/4287 |

FOREIGN PATENT DOCUMENTS

| | | |
|---|---|---|
| FR | 2125876 | 9/1972 |
| FR | 2240627 | 3/1975 |
| WO | WO2013085503 | 6/2013 |

\* cited by examiner

WASHER FLUID VEHICLE RESERVOIR

PRIORITY CLAIM

In accordance with 37 C.F.R. § 1.76, a claim of priority is included in an Application Data Sheet filed concurrently herewith. Accordingly, the present invention is a CIP of, and claims priority to, U.S. patent application Ser. No. 15/819,870 entitled "WASHER FLUID VEHICLE RESERVOIR", filed Nov. 21, 2017 which claims priority based upon U.S. Provisional Patent Application No. 62/425,412, entitled "WASHER FLUID VEHICLE RESERVOIR" filed Nov. 22, 2016. The contents of which the above referenced application is incorporated herein by reference.

FIELD OF THE INVENTION

The invention is directed to an improved vehicle reservoir for storing washer fluid in vehicles servicing more than one location.

BACKGROUND OF THE INVENTION

Washer fluid can be used on vehicles for various applications. Typical reservoirs are installed on the vehicles to hold a cleaning liquid, which conventionally was used to clean the exterior of a windshield glazing surface. The cleaning liquid is nonabrasive and should not leave a coating or residue on the surface. Typically, the liquid consists of distilled water, and various additives can be included to help in insect removal and/or operation in freezing temperatures. Methanol and ethylene glycol are commonly known additives used to lower the freeze temperature of the fluid.

Conventional washer fluid reservoirs are used primarily to hold cleaning fluid for use on a vehicle windshield. The washer reservoir is typically mounted in the engine compartment, and employs an electric pump to transfer fluid upon demand from the reservoir to the windshield.

Vehicle reservoirs have become more complex as they are used to hold the fluid required to clean multiple areas in the vehicle. The reservoirs may be used to service windshields, rear windows, mirrors, headlamps, back-up cameras and numerous other sensors that can benefit from rinsing with washer fluid. Conventional practice is to couple an electric pump operated upon demand for each area to be serviced. An average vehicle may include three or more pumps to deliver fluid to the front windshield, rear window, and headlights. More complex vehicles may further include pumps for directing fluid to cameras and proximity sensors. In many instances, the operator of the vehicle does not frequently use all of the pumps, leading to early degradation and failure of the pumps.

In addition, the use of additional pumps adds cost, complexity, design packaging challenges and potential EMC issues. The pumps are complex and must produce a strong, continuous flow of fluid upon demand, as any delay could result in a safety hazard.

Washer pumps are considered high maintenance items and are known to be a high warranty claim item. What is lacking in the industry is a vehicle reservoir system using, preferably, a single pump, or fewer total pumps to service multiple locations with a fluid, either gas or liquid.

SUMMARY OF THE INVENTION

Disclosed is an improved vehicle washer reservoir system employing a single pump with a fluid distribution manifold. The fluid distribution manifold has a single inlet port that is fluidly coupled to the pump, drawing fluid from the reservoir. The manifold has multiple exit ports, preferably a sized port to each of the vehicle locations. Sized ports allow a larger sized port to be applied to a windshield washing application and smaller diameter ports for sensor cleaning. In the primary embodiment, a pump would pressurize a cavity of the manifold and fluid would be released through solenoid, or otherwise actuated, valves on each exit port. The manifold could be coupled directly to the reservoir or remotely mounted, allowing flexibility in mounting locations. Further, multiple manifolds may be used to accommodate shorter or longer runs from the holding tank to the point of use, or it could be plumbed at the washer reservoir if space allows.

In one embodiment, the manifold has universal mounting tabs or "turkey feet" for support, and is made from two piece injection molded members. The backside of the ports can be bell mouthed for improved entry flow conditions. Exit ports can be molded on both halves to improve directionality. Multiple port sizes allow for different flow rates without the need for flow restrictors.

In another embodiment, the washer fluid distribution manifold can manage the distribution of applicable fluids, including either liquids or gases individually, simultaneously, or a combination of these in a predefined sequence. In cases where dry gases are needed to clean certain surfaces, the manifold can direct the flow of pressurized gases or liquid/gas mixtures to the desired flow circuit location. It is envisioned that certain environmental factors may require such flow circuits have access to liquid solvent or antifreeze solutions to maintain functionality in frozen or extremely dirty conditions, in addition to pressurized gases.

An objective of the instant invention is to teach a vehicle washer reservoir system that supplants the need for separate pumps for multiple rinsed items with, ideally, a single pump concept; but which may also accommodate a plurality of pumps if the need exists.

Still another objective of the invention is to increase the reliability of a vehicle washing system by using a manifold for distributing fluid to multiple locations using solenoid-like actuated valves.

Yet another objective of the invention is to provide a vehicle washer system that allows remote placement of a fluid reservoir.

Still another objective of the invention is to limit the amount of pumps and associated electromagnetic interference.

Yet another objective of the invention is to provide a pressurized vehicle washer reservoir system to provide immediate flow to safety items versus motor ramp up lag time with a conventional pump.

Yet still another objective of the invention is to provide a lower cost system by eliminating the need for a large number of pumps.

Still yet another objective of the invention is to provide a lower cost washer system with improved reliability by replacing multiple high warranty pumps with a single pump, or fewer numbers of pumps, that will be used more frequently thereby maintaining valve and seal integrity by usage.

Yet still another objective of the invention discloses a single manifold used to manage flows, either liquid or pressurized gas, which is provided to it by two separate storage and delivery systems; one for liquids and the other for compressed gases.

Other objectives and advantages of this invention will become apparent from the following description taken in conjunction with any accompanying drawings wherein are set forth, by way of illustration and example, and certain embodiments of this invention. Any drawings contained herein constitute a part of this specification and include exemplary embodiments of the present invention and illustrate various objects and features thereof.

DETAILED DESCRIPTION OF THE PREFERRED EMBODIMENT

Figure 1:
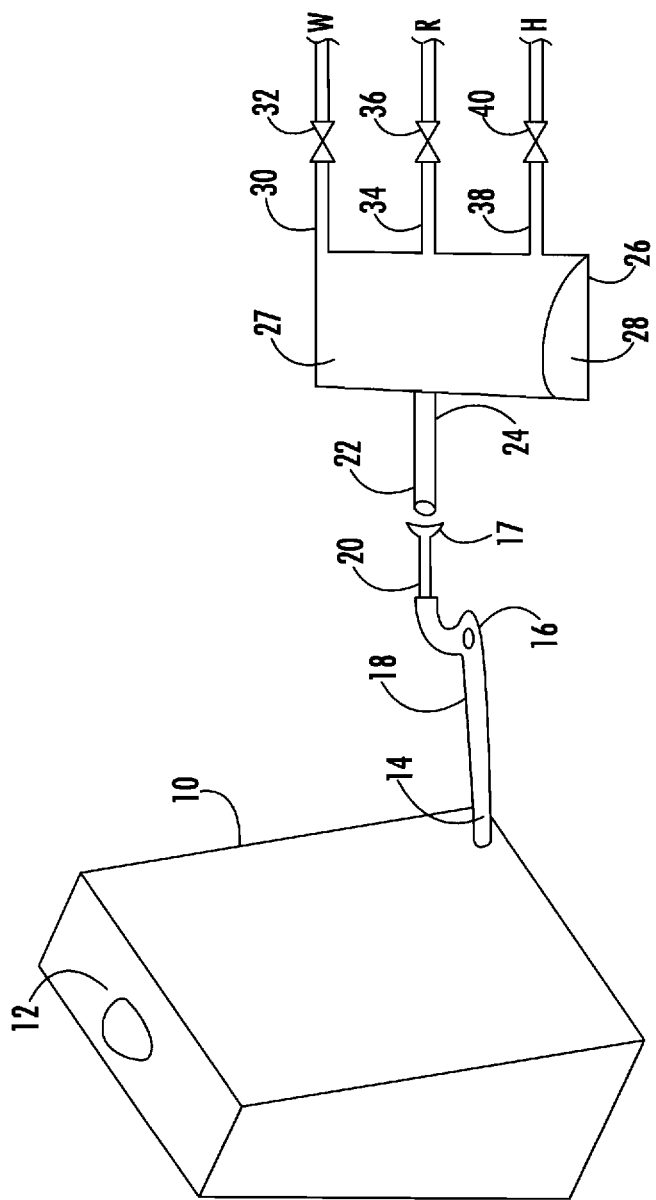
FIG. 1 is a pictorial flow diagram of the fluid reservoir system.

Detailed embodiments of the instant invention are disclosed herein; however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures, set forth is a washer fluid reservoir 10 having a reservoir inlet 12 and a reservoir outlet 14. The interior of the reservoir available for receipt of washer fluid through the reservoir inlet 12 for storing therein. A pump 16 having an inlet 18 is coupled to the reservoir outlet 14 providing a flooded suction to the pump 16. Preferably, a check valve 17 is positioned after the pump 16 to prevent back flow of pumping washing fluid. The preferred embodiment employs a conventional washer pump where are not self-priming. For this reason the preferred embodiment places the pump 16 at the bottom of the reservoir so that the pump inlet 18 is always below the reservoir fluid level. In another embodiment, the pump is placed within the reservoir or has an inlet of zero length.

The reservoir can be mounted anywhere in a vehicle, as the single pump allows ease of fluid transfer by providing a pressurize flow of washer fluid. The outlet 20 of the pump allows remote coupling to a manifold 26 by connecting tube 22 through manifold inlet 24. The manifold 26 having a cavity 27 for receipt of fluid transferred from the reservoir 10. The manifold 26 may include a pressure maintaining device such as a bladder 28 to maintain a fluid pressure in the manifold providing instantaneous flow of fluid when needed. The pressure maintaining device can consist of a traditional bladder/compressible gas construct, a compressible, elastic, gas-filled ball, or any other form of non-powered, passive pressure maintaining concept.

For purposes of illustration, the flow through style manifold 26 of FIG. 1 depicts three outlets. A first outlet 30, having a first diameter size, is coupled to solenoid valve 32. The first outlet 30 may be sized for uninhibited flow to the windshield W. A second outlet 34, having a second diameter, is coupled to a solenoid valve 36. The second diameter may be different than the diameter of the first outlet 30, and coupled to an area of the vehicle that may need cleaning, but not requiring as much fluid as the front windshield. For this example, the second solenoid 36 directs fluid to a rear window R. A third outlet 38, having a third diameter, is coupled to a third solenoid valve 40. The third outlet 38 may be of a reduced size for directing flow to headlights H, which would benefit from flushing with fluid but need not have the flow rate necessary to clean the front windshield or rear window. The outlets are sized to provide a flow rate to best service an individual component. The outlet size may be a function of a flow restrictor, or preferably, the diameter of the outlet is sized to accommodate the flow rate.

While three exit ports are illustrated, additional ports can be used to accommodate most any item on a vehicle that would benefit from a clean rinse with water; this includes the cameras found on modern day vehicles, as well as proximity sensors used for braking and parking, and the numerous sensors envisioned to be required with the evolution of autonomous or semi-autonomous vehicles.

Figure 2:
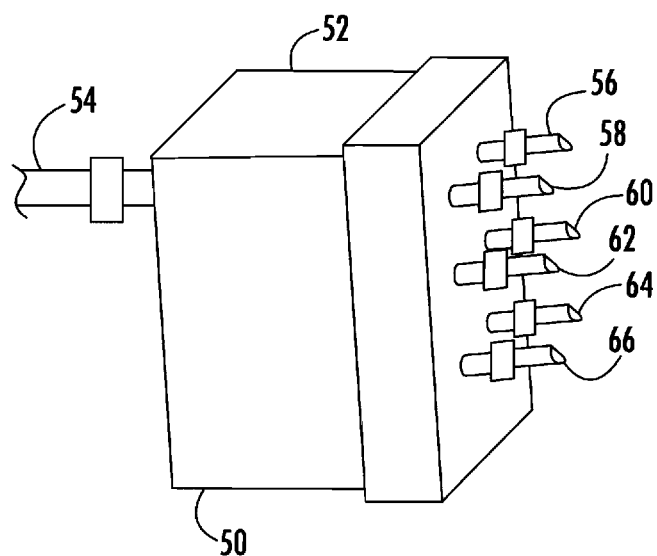
FIG. 2 is a pictorial view of a reservoir manifold.

Referring to FIG. 2, depicted is a reservoir style manifold 50 formed from a housing 52 having an inlet 54, upper outlets 56,58; central outlets 60,62; and lower outlets 64,66. The outlets may have different diameters depending on the flow rate required for each item serviced. Similar to the aforementioned embodiment, the outlets all include an electrically operated solenoid secured to each outlet wherein the solenoid is operated to allow fluid flow from the reservoir through a selected manifold outlet. The manifold is fluidly coupled to the outlet of a pump wherein at least one outlet is constructed and arranged to deliver washing fluid pressurized by the pump to a windshield and additional outlets constructed and arranged to deliver washing fluid to another location on the vehicle that benefits from being rinsed with washing fluid such as the rear windows, side windows, headlamps, cameras, sensors, off road lamps. By use of a solenoid, versus independent pumps, washing fluid can be economically delivered to most any area of a vehicle including abstract uses such as removing ice from a mud flap. The electrically operated solenoids secured to each manifold outlet operate to allow fluid flow from the reservoir style manifold through a selected manifold outlet.

Figure 3:
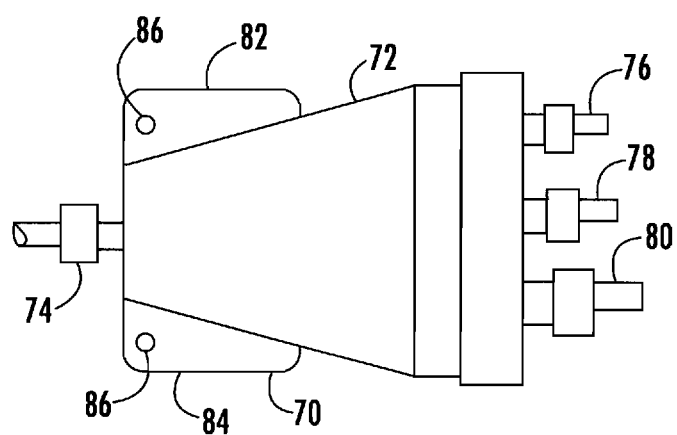
FIG. 3 is a pictorial view of a flow through reservoir manifold.

Referring to FIG. 3, depicted is a flow through style manifold 70 formed from a housing 72 having an inlet 74, upper outlet 76, central outlet 78 and lower outlet 80. Flange tabs 82 and 84 illustrate the flexibility in mounting the manifold using mounting holes 86 to facilitate securement of the manifold. Similar to the reservoir style manifold, the outlets may have different diameters depending on the flow rate required for each item serviced. The manifold is constructed from two piece injection molded members. The backside of the ports can be bell shaped for flow. Exit ports can be molded on both halves to improve directionality. Multiple port sizes allow for different flow rates without the need for flow restrictors. In the preferred embodiment, the manifold employs individual solenoids.

The instant invention further allows for simplicity in installation, wherein a single pump can be activated by any item that requests fluid washing. For instance, if a rear window is in need of fluid washing, the pump and associated solenoid can be operated. If a headlight is in need of fluid washing, the pump and associated solenoid valve can be operated. This eliminates the need for wiring to individual pumps, and replaces individual pump tubing with electrical solenoid wiring.

In an alternative embodiment, a valve may be used with multiple linear positions that distribute the fluid to the proper port. Still another embodiment could employ a rotary distribution system using a stepper motor or servo to align the pumped fluid to the item to be cleaned.

Figure 4:
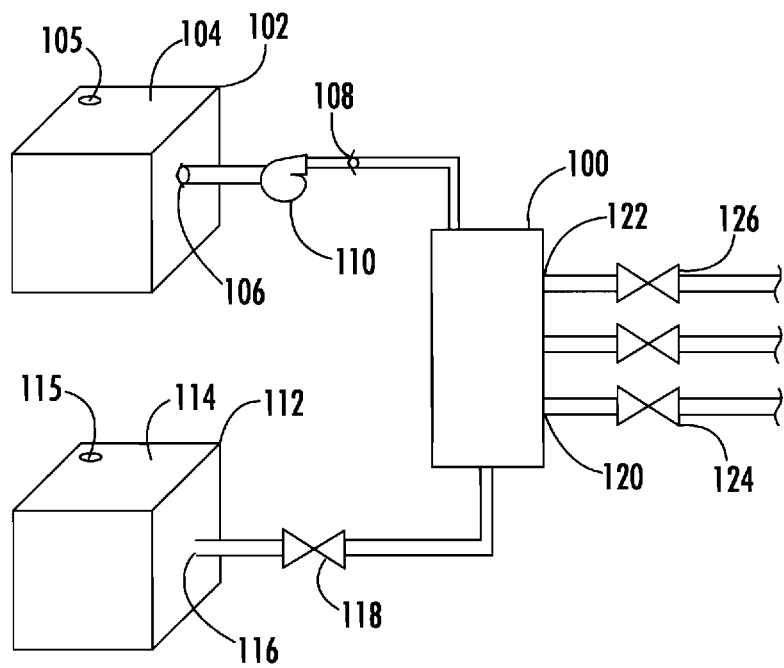
FIG. 4 is a pictorial view of a dual reservoir, single manifold fluid reservoir system.
Figure 5:
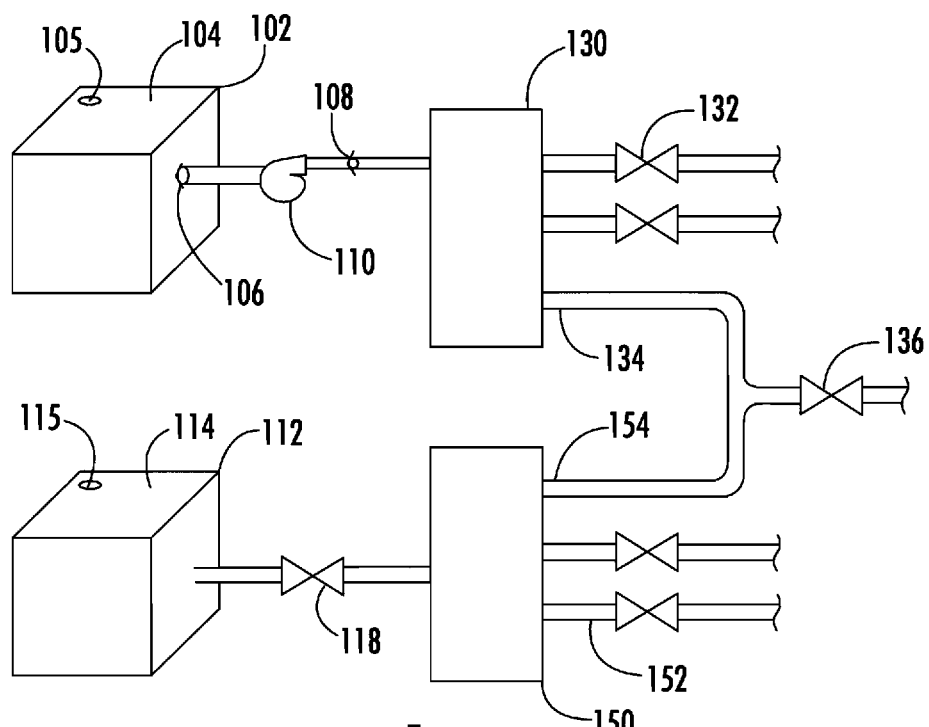
FIG. 5 is a pictorial view of a dual reservoir, dual manifold fluid reservoir system.

Referring in general to FIGS. 4 and 5, the washer fluid distribution manifold can manage the distribution of applicable fluids, including either liquids or gases individually, simultaneously, or a combination of these in a predefined sequence. In cases where dry gases are needed to clean certain surfaces, the manifold can direct the flow of pressurized gases or liquid/gas mixtures to the desired flow circuit location. It is envisioned that certain environmental factors may require such flow circuits have access to liquid solvent or antifreeze solutions to maintain functionality in frozen or extremely dirty conditions, in addition to pressurized gases.

One operational embodiment may be that antifreeze/solvent liquid is maintained within the fluid passages to prevent fouling, especially if the environment includes sub-freezing temperatures. The manifold system initially provides a flow of antifreeze/solvent liquid to clear the fluid passages and provide initial cleaning, followed by pressurized gas, such as compressed air) to provide additional clearing of both the flow passages and the target surface, then another pulse of antifreeze/solvent to refill the fluid passages to protect the passages and nozzles until the next use of the cleaning system.

Another operational embodiment may be that of a metered combination of liquid and pressurized gas (ostensibly compressed air) used to provide a more energetic flow to the nozzles for aggressive cleaning, followed by a pulse of pressurized gas, and then another pulse of antifreeze/solvent fluid.

Other operational embodiments may use other feasible combinations of the different available flows to achieve staged cleaning effects as needed or adapted programmatically for the environment at hand.

A functional embodiment of the manifold system is that a single manifold 100 is used to manage flows, either liquid or pressurized gas, which is provided to it by two separate storage and delivery systems. A first fluid reservoir 102 having an interior chamber 104 with a first reservoir inlet 105 permitting insertion of washing fluid within the chamber 104 and a first reservoir outlet 106. In this embodiment a check valve 108 is positioned between the reservoir outlet 106 and a pump 110 coupled to the first reservoir outlet 106. The pump 110 with reservoir outlet 106 is used for drawing fluid from the chamber 104.

A second fluid reservoir 112 having an interior chamber 114 with a second reservoir inlet 115 permitting insertion of a compressed fluid within the chamber 114 and a second reservoir outlet 116. In the preferred embodiment the compressed fluid is compressed air. A solenoid 118 is coupled to the second reservoir outlet 116 allowing passage of compressed fluid from the chamber 114 upon activation of the solenoid 118 for pressurized delivery to the manifold 100. The manifold 100 is fluidly coupled to the first and second reservoir outlets 106 and 116. The manifold 100 has at least one outlet 120 constructed and arranged to deliver fluid to a windshield and at least one additional outlet 122 constructed and arranged to deliver washing fluid to another location on the vehicle that benefits from being rinsed with fluid. An electrically operated solenoid 124 and 126 is secured to each manifold outlet 120, 122 wherein the solenoids are operated to allow fluid flow from the reservoirs 102 and 112 through a selected manifold outlet. In this embodiment, the single manifold 10 is used to manage flows, either liquid or pressurized gas, which is provided to it by two separate storage and delivery systems, one for liquids and the other for compressed gases In another embodiment, depicted in FIG. 5, a functional embodiment of the manifold system is where a first linear valve manifold 130 and a second linear valve manifold 150 is used to manage flows, either liquid or pressurized gas, which is provided to it by two separate storage and delivery systems. In this embodiment, a first fluid reservoir 102 having an interior chamber 104 with a first reservoir inlet 105 permitting insertion of washing fluid within the chamber 104 and a first reservoir outlet 106. A pump 110 is coupled to the first reservoir outlet 106. The pump 110 with reservoir outlet 106 is used for drawing fluid from the chamber 104.

A second fluid reservoir 112 having an interior chamber 114 with a second reservoir inlet 115 permitting insertion of a compressed fluid within the chamber 114 and a second reservoir outlet 116. In the preferred embodiment the compressed fluid is compressed air. A solenoid 118 is coupled to the second reservoir outlet 116 allowing passage of compressed fluid from the chamber 114 upon activation of the solenoid 118 for pressurized delivery to the manifold 150.

In this embodiment linear valve manifold 130 is fluidly coupled to the first reservoir 102 and has at least one outlet 132 arranged to deliver washing fluid and at least one second outlet 134 arranged to deliver fluid to a location 136 that benefits from being rinsed with liquid and gas. Similarly, linear valve manifold 150 is fluidly coupled to the second reservoir 150 and has at least one outlet 152 arranged to deliver a rising fluid and at least one second outlet 154 arranged to deliver fluid to a location 136 that benefits from being rinsed with liquid and gas. The linear valve manifold may be used with multiple linear positions to distribute fluid to different outlets of each manifold. The linear valve manifolds manage distribution of fluids as a liquid or gas, individually, simultaneously, or in a predefined sequence. By having a liquid and gas capability, a metered combination of liquid and pressurized gas can be used to provide a more energetic flow to nozzles for aggressive cleaning, followed by a pulse of pressurized gas, and a pulse of liquid such as antifreeze/solvent fluid. Further, the combination of fluid reservoirs can be used to clear fluid passages and provide initial cleaning of a target surface, followed by a pressurized gas to provide additional clearing of the flow passage and the target surface, and then another pulse of liquid to refill fluid passages to protect the passages and nozzles until use. A capacitive bladder can be placed within the reservoir wherein the capacitive bladder is constructed and arranged to provide maintain a predetermined fluid pressure. In addition, the manifold can be formed integral with said first or second reservoir.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and drawings/figures.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention. Although the invention has been described in connection with specific preferred embodiments, it should be understood that the invention should not be unduly limited to such specific embodiments.

What is claimed is:

1. A washer reservoir system for a vehicle comprising:
a first reservoir for receipt of a liquid;
a pump coupled to an outlet of said first reservoir;
a second reservoir for receipt of compressed gas;
a reservoir solenoid coupled to an outlet of said second reservoir;
a manifold having an inlet fluidly coupled to said pump and an inlet fluidly coupled to said reservoir solenoid, said manifold having a plurality of manifold outlets, said manifold constructed and arranged to distribute to said manifold outlets a first sequence of liquid transferred through said pump, a second sequence of liquid transferred through said pump and compressed gas passed through said reservoir solenoid, and a third sequence of compressed gas passed through said reservoir solenoid; said manifold comprises a first manifold having at least one first outlet and at least one second outlet, a second manifold having at least one first outlet and at least one second outlet, the first reservoir connected to the first manifold and the second reservoir connected to the second manifold, wherein the first sequence distributes liquid from the at least one first outlet of the first manifold, the second sequence distributes the liquid and compressed gas through the at least one second outlet of the first manifold and the at least one second outlet of the second manifold to a joined outlet, and the third sequence distributes compressed gas through the at least one first outlet of the second manifold; and
a plurality of manifold solenoids fluidly coupled to each of the at least one first and second outlets of the first and second manifolds to manage distribution of each sequence of liquid and compressed gas;
wherein operation of said reservoir solenoid and said pump allows selection of said first, second and third sequence with said manifold solenoids constructed and arranged to distribute a selected sequence.

2. The washer reservoir system according to claim 1 wherein said manifold outlets are sized to limit the flow of fluid through each said outlet.

3. The washer reservoir system according to claim 2 wherein at least one said manifold outlet has a different diameter than an adjoining manifold outlet.

4. The washer reservoir system according to claim 1 wherein at least one manifold outlet is bell shaped.

5. The washer reservoir system according to claim 1 wherein said manifold is metered for providing a pulse of liquid, followed by a pulse of compressed gas, and a pulse of fluid.

6. The washer reservoir system according to claim 1 including a check valve positioned after said pump wherein said check valve prevents backflow of liquid into said first reservoir.

7. The washer reservoir system according to claim 1 including a bladder placed within said manifold, said bladder constructed and arranged to maintain a predetermined fluid pressure within said manifold.

8. The washer reservoir system according to claim 1 wherein said manifold is formed integral with said first reservoir.

9. The washer reservoir system according to claim 1 wherein said manifold is formed integrally with said second reservoir.

* * * * *